United States Patent
Yaramada et al.

(10) Patent No.: US 11,630,956 B2
(45) Date of Patent: Apr. 18, 2023

(54) EXTRACTING DATA FROM DOCUMENTS USING MULTIPLE DEEP LEARNING MODELS

(71) Applicant: Jade Global, Inc., San Jose, CA (US)

(72) Inventors: Karan Yaramada, San Jose, CA (US);
Akhil Sahai, Cupertino, CA (US);
Adesh Patel, Pune (IN)

(73) Assignee: Jade Global, Inc., San Jose, CA (US)

( * ) Notice: Subject to any disclaimer, the term of this patent is extended or adjusted under 35 U.S.C. 154(b) by 240 days.

(21) Appl. No.: 17/074,954

(22) Filed: Oct. 20, 2020

(65) Prior Publication Data

US 2022/0121821 A1 Apr. 21, 2022

(51) Int. Cl.
*G06F 40/295* (2020.01)
*G06F 40/205* (2020.01)
*G06N 20/00* (2019.01)

(52) U.S. Cl.
CPC .......... *G06F 40/295* (2020.01); *G06F 40/205* (2020.01); *G06N 20/00* (2019.01)

(58) Field of Classification Search
CPC ................. G06F 40/295; G06F 40/205; G06F 18/24143; G06N 20/00; G06N 3/0454; G06N 3/045; G06V 30/40; G06V 30/19007; G06V 30/412; G06V 30/414; G06K 9/6274
See application file for complete search history.

(56) References Cited

U.S. PATENT DOCUMENTS

| | | | |
|---|---|---|---|
| 10,896,357 B1 * | 1/2021 | Corcoran | G06V 30/414 |
| 11,176,443 B1 * | 11/2021 | Selva | G06K 9/6267 |
| 2018/0033147 A1 * | 2/2018 | Becker | G06V 30/40 |
| 2021/0056300 A1 * | 2/2021 | Chitta | G06V 30/412 |
| 2021/0279461 A1 * | 9/2021 | Sarkar | G06V 10/82 |
| 2021/0343030 A1 * | 11/2021 | Sagonas | G06V 30/414 |
| 2021/0397938 A1 * | 12/2021 | Tora | G06F 16/906 |

(Continued)

OTHER PUBLICATIONS

Acharyya, M., & Kundu, M. K. (2002). Document image segmentation using wavelet scale-space features. IEEE transactions on circuits and systems for video technology, 12(12), 1117-1127. (Year: 2002).*

(Continued)

*Primary Examiner* — Bhavesh M Mehta
*Assistant Examiner* — Philip H Lam
(74) *Attorney, Agent, or Firm* — Fountainhead Law Group PC

(57) ABSTRACT

Techniques for automatically extracting data from documents using multiple deep learning models are provided. According to one set of embodiments, a computer system can receive a document in an electronic format and can segment, using an image segmentation deep learning model, the document into a plurality of segments, where each segment corresponds to a visually discrete portion of the document and is classified as being one of a plurality of types. The computer system can then, for each segment in the plurality of segments, retrieve text in the segment using optical character recognition (OCR) and extract data in the segment from the retrieved text using a named entity recognition (NER) deep learning model, where the retrieving and the extracting are performed in a manner that takes into account the segment's type.

20 Claims, 5 Drawing Sheets

(56) References Cited

U.S. PATENT DOCUMENTS

2022/0012421 A1* 1/2022 Yuan ................ G06F 40/151
2022/0188520 A1* 6/2022 Iso-Sipila ........... G06F 40/295

OTHER PUBLICATIONS

Moysset, B., Kermorvant, C., Wolf, C., & Louradour, J. (Aug. 2015). Paragraph text segmentation into lines with recurrent neural networks. In 2015 13th international conference on document analysis and recognition (ICDAR) (pp. 456-460). IEEE. (Year: 2015).*

* cited by examiner

FIG. 3A

EXTRACTING DATA FROM DOCUMENTS USING MULTIPLE DEEP LEARNING MODELS

BACKGROUND

Unless otherwise indicated, the subject matter described in this section is not prior art to the claims of the present application and is not admitted as being prior art by inclusion in this section.

Many types of documents such as invoices, receipts, statements, forms, and so on are structured in accordance with a predefined visual layout/template of elements in which each element conveys some designated piece of information to the document reader. For example, the invoices generated by a particular business may be structured to include, among other things, an invoice number field and an invoice date field in the document header and an item table whose rows present the details of each invoice line item. These types of documents are collectively referred to herein as "template-based" documents.

The ability to automatically extract data from template-based documents is useful in a variety of contexts and applications (e.g., document classification, data analytics and reporting, etc.), but is challenging to implement correctly. One data extraction approach involves employing natural language processing (NLP) to scan and recognize the entire content of a template-based document. However, because NLP techniques operate solely on text, they are unable to understand the document's structural layout—which is often key in interpreting the document's content—and thus cannot leverage such layout information in order to perform its text recognition in the most accurate manner.

Another data extraction approach involves using computer vision to segment a template-based document into discrete portions (e.g., image representations) based on the document's visual appearance. However, using computer vision alone makes it difficult to understand and extract the true meaning of each segmented portion. For example, the image representation of an invoice number field and the image representation of an invoice date field can be quite similar in appearance and thus computer vision techniques may erroneously consider these two image representations to contain the same type of data.

BRIEF DESCRIPTION OF DRAWINGS

FIGS. 3A and 3B depict an example invoice and the extraction of data from that invoice according to certain embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for using multiple deep learning models to automate the extraction of data from electronic documents, such as template-based documents. As known in the art, a deep learning model is a machine learning (ML) algorithm that relies on the layers of an artificial neural network to generate, or predict, an output for a given data input (i.e., query).

In one set of embodiments, a data extractor component of a document processing system can receive an electronic (e.g., scanned) version of a template-based document and employ a computer vision-based image segmentation deep learning model to (1) segment the document, based on its visual appearance, into a number of discrete portions (referred to herein as "segments"), and (2) classify each segment as being an instance of a particular type of element typically found in the documents on which the model has been trained (e.g., a row or column field, a table, etc.).

Upon creating and identifying the document's segments, the data extractor can, for each segment, (3) extract the text of the segment using optical character recognition (OCR), and (4) employ an NLP-based named entity recognition (NER) deep learning model to process the extracted text and thereby recognize the data in the segment, in accordance with the segment's type (as identified at step (2)). For example, if the segment is a table, the data extractor can identify each cell of the table, extract the text in each cell via OCR, and apply the NER deep learning model to process the per-cell text. Alternatively, if the segment is a row field or column field, the data extractor can skip the cell identification step and extract and process the text of the entire segment.

Finally, the data extractor can merge the data recognized/extracted from all of the document's segments into a single output and provide that output to one or more downstream components for further processing (e.g., anomaly detection, data cleanup/verification, etc.) and/or to a storage system for storage. The foregoing and other aspects of the present disclosure are described in further detail in the sections that follow.

2. System Environment and Solution Architecture

Figure 1:
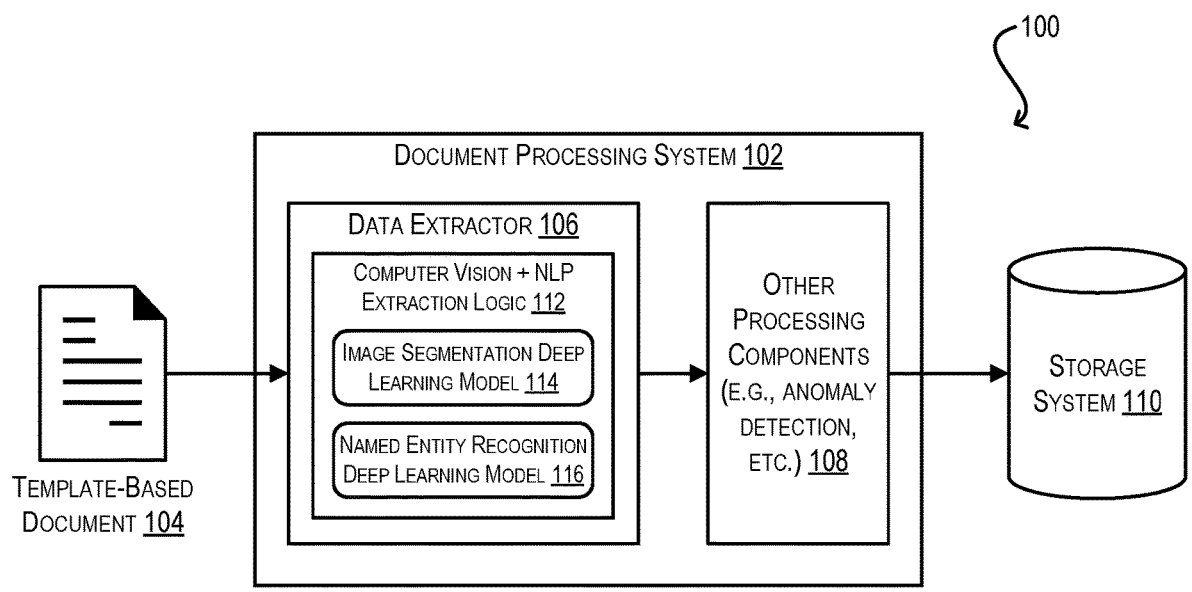
FIG. 1 depicts a system environment comprising a document processing system according to certain embodiments.

FIG. 1 depicts a system environment 100 comprising a document processing system 102 that implements the data extraction techniques of the present disclosure. Document processing system 102 is a software-based system that can run on any type of computing device or system known in art, such as a desktop computer, a server, a mobile/handheld device, and so on. In some embodiments, document processing system 102 may run on a cluster of multiple physical or virtual machines such as the machines in an on-premises or cloud-based enterprise deployment.

At a high level, document processing system 102 is configured to receive an electronic version of a template-based document 104 (e.g., an invoice, receipt, statement, form, contract, etc.) and provide that electronic version—hereinafter referred to as simply "template-based document 104" or "document 104"—as input to a data extractor component 106. For instance, template-based document 104 may take the form of an image file (e.g., JPEG, TIFF, PNG, etc.), a Portable Document Format (PDF) file, or the like.

In response, data extractor 106 is configured to recognize and extract the data included in template-based document 104. For example, if template-based document 104 is an invoice, data extractor 106 may recognize and extract the invoice number, the invoice date, the bill-to address, the ship-to address, and the details of each line item of the invoice (e.g., item number, item description, item quantity, unit price, total amount, etc.). As another example, if template-based document 104 is a receipt, data extractor 106 may recognize and extract the receipt number, the receipt date, and the details of each purchased item identified on the receipt.

Upon extracting the data in template-based document 104, data extractor 106 can provide that data (in the form of a data object/file, such as a JSON (JavaScript Object Notation) object/file) to one or more downstream components 108 of document processing system 102. Downstream component(s) 108 can include, e.g., an anomaly detection component configured to automatically detect anomalies in the extracted data, a data verification component that enables human reviewers to review and verify the extracted data, and so on. Finally, the processed data object/file can be persisted in a storage system 110 for retention, archival, and/or other purposes.

As mentioned previously, one approach for extracting the data in template-based documents such as document 104 is to employ NLP techniques to scan and recognize the entire content of the document. Another approach is to employ computer vision techniques to split the document into discrete portions and classify each portion based on its visual appearance. However, using each of these approaches in isolation suffers from a number of drawbacks (e.g., inability of NLP to understand the document's structural layout, inability of computer vision to recognize the actual meaning of each segmented portion, etc.).

To address the foregoing and other similar limitations, data extractor 106 of FIG. 1 includes a novel "computer vision+NLP extraction logic" component 112 that comprises both a computer vision-based image segmentation deep learning model 114 and an NLP-based NER deep learning model 116. Image segmentation deep learning model 114—which may be implemented using a convolutional neural network (CNN), a fully convolutional network (FCN), or any other type of artificial neural network appropriate for the image segmentation task—is trained to receive, as input, an image of a document and to output a plurality of segments of that document, where each segment is classified as being an instance of a particular document element type. For instance, if the input document image is an image of an invoice including an invoice number field, an invoice date field, a bill-to address field, a ship-to address field, and an item table, image segmentation deep learning model 114 can output five segments: a first segment that comprises the portion of the document image including the invoice number field and is classified as a "row field," a second segment that comprises the portion of the document image including the invoice date field and is classified as a "row field," a third segment that comprises the portion of the document image including the bill-to address field and is classified as a "column field," a fourth segment that comprises the portion of the document image including the ship-to address field and is classified as a "column field," and a fifth segment that comprises the portion of the document image including the item table and is classified as a "table."

NER deep learning model 116—which may be implemented using a CNN, a recurrent neural network (RNN), or any other type of artificial neural network appropriate for the NER task—is trained to receive, as input, a text string and to output an annotated version of that text string which identifies the named entities in the text (thereby recognizing the data therein). For instance, if the input text string is "Invoice #: 12345," NER deep learning model 116 can output an annotated version of this string that identifies value "12345" as being an invoice number. In certain embodiments, as part of this recognition process, NER deep learning model 116 can make use of a named entity dictionary (not shown) that contains a list of named entities that model 116 is able to recognize.

As detailed in section (3) below, computer vision+NLP extraction logic 112 enables data extractor 106 to carry out a workflow for extracting data from template-based document 104 that first identifies and classifies the segments in document 104 using image segmentation deep learning model 114, and then recognizes and extracts the data in each segment (per the segment's type) using NER deep learning model 116. With this unique two-tiered approach, the noise and error rate of the named entity recognition process can be substantially reduced, resulting in more accurate data extraction output than is possible by applying computer vision or NLP alone.

It should be appreciated that system environment 100 shown in FIG. 1 is illustrative and not intended to limit embodiments of the present disclosure. For example, although FIG. 1 depicts a particular arrangement of entities and components in system environment 100, other arrangements are possible (e.g., the functionality attributed to a particular entity/component may be split into multiple entities/components, entities/components may be combined, etc.). Further, the various entities/components shown in system environment 100 may include sub-components and/or functions that are not specifically described. One of ordinary skill in the art will recognize other variations, modifications, and alternatives.

3. Data Extraction Workflow

Figure 2:
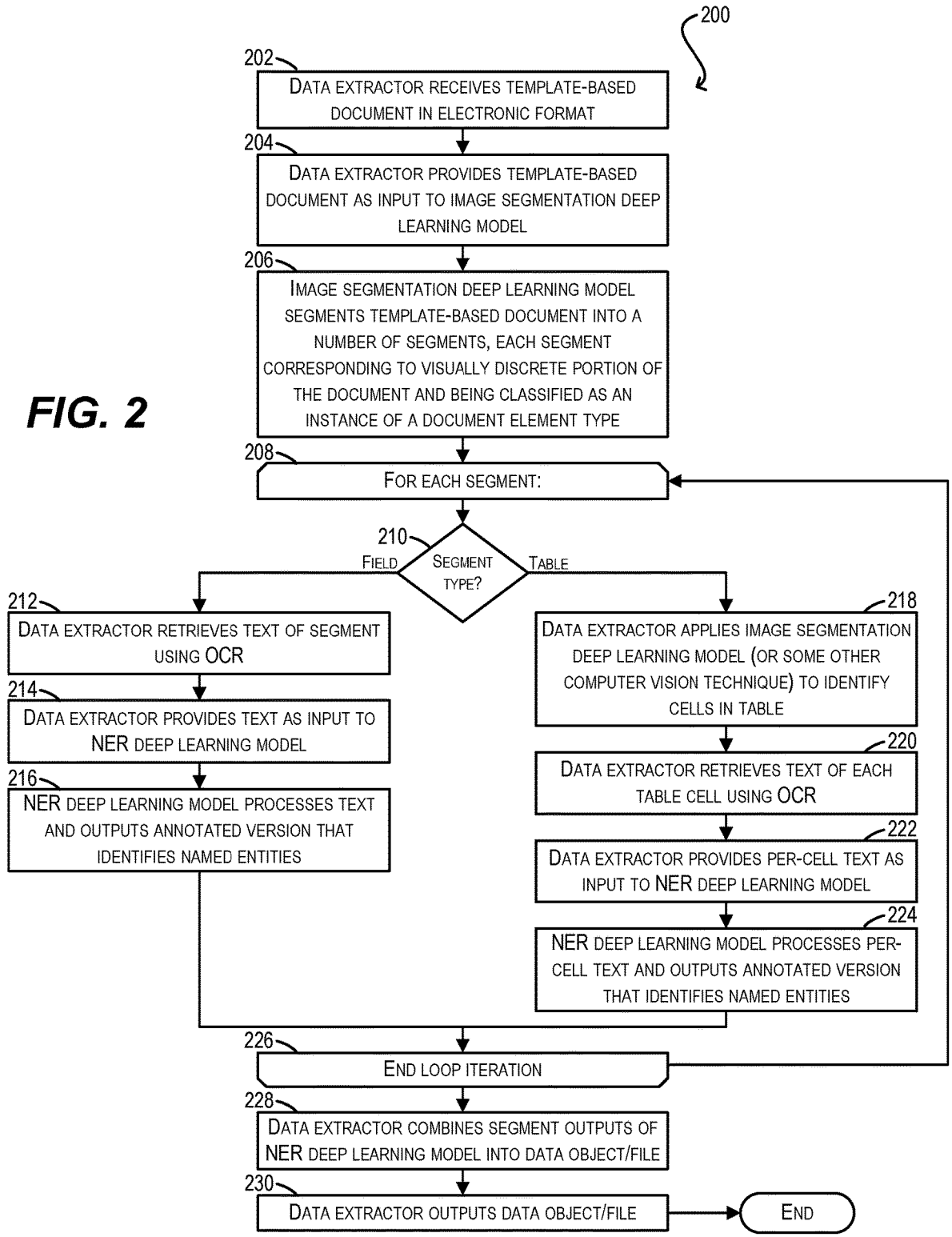
FIG. 2 depicts a workflow for extracting data from a document according to certain embodiments.

FIG. 2 depicts a workflow 200 that may be executed by data extractor 106 of FIG. 1—in accordance with its computer vision+NLP extraction logic 112—for automatically extracting the data contents of template-based document 104 using a combined computer vision and NLP approach according to certain embodiments. Workflow 200 assumes that image segmentation deep learning model 114 and NER deep learning model 116 have been trained on training datasets that enable these models perform their respective image segmentation and NER tasks in an effective manner.

Starting with blocks 202 and 204, data extractor 106 can receive template-based document 104 in an electronic format (e.g., as an image file, PDF file, etc.) and can provide document 104 as input to image segmentation deep learning model 114.

At block 206, image segmentation deep learning model 114 can process template-based document 114 in accordance with its training and output a segmentation (i.e., a number of segments) of document 104, where each segment is classified as being an instance of a particular document element type. For example, in the embodiment of workflow 200, image segmentation deep learning model 114 can classify each segment as being a "field" (i.e., a field comprising one or more rows and/or columns of text) or a "table" (i.e., a table comprising a number of cells). In other embodiments image segmentation deep learning model 114 can make use of additional classifications such as "image," "title," "subtitle," and so on.

Once image segmentation deep learning model 114 has output the segments of template-based document 104, data extractor 106 can enter a loop 208 for each segment and can check whether the current segment is of type "field" or "table" (block 210). If the current segment is a "field," data extractor 106 can retrieve the text of the segment using OCR techniques (block 212) and provide the text as input to NER deep learning model 116 (block 214). In response, NER deep learning model 116 can process the segment text in accordance with its training and output an annotated version of the text that identifies the named entities therein, thereby recognizing/extracting the data in the segment (block 216).

On the other hand, if the current segment is determined to be a "table" at block 210, data extractor 106 can apply image segmentation deep learning model 114 (or some other computer vision technique) to identify the individual cells in the table (block 218). Data extractor 106 can then proceed with retrieving the text in each cell using OCR (block 220) and providing the per-cell text as input to NER deep learning model 116 (block 222). In response, NER deep learning model 116 can process the text in each cell in accordance with its training and output an annotated version of the text that identifies the named entities therein in a manner similar to block 216 (block 224).

At block 226, data extractor 106 can reach the end of the current loop iteration and return to the top of loop 208 in order to process the next document segment. Once all of the segments have been processed, data extractor 106 can combine the annotated text output by NER deep learning model 116 for each segment into a data object/file associated with template-based document 104 (block 228), thereby aggregating the data extracted from document 104 into that data object/file. Finally, at block 230, data extractor 108 can output the data object/file and workflow 200 can end.

As mentioned previously, in some embodiments the data object/file can be passed to one or more downstream components of document processing system 102 for further processing. For example, in a particular embodiment the data object/file can be passed to an anomaly detection component that is configured to apply an anomaly detection deep learning (or machine learning) model to detect unusual data in template-based document 104 (e.g., an invoice with duplicate/erroneous charges, etc.). Upon detecting such unusual data, document 104 may be flagged for review by, e.g., a user/administrator of document processing system 102.

Figure 3A:
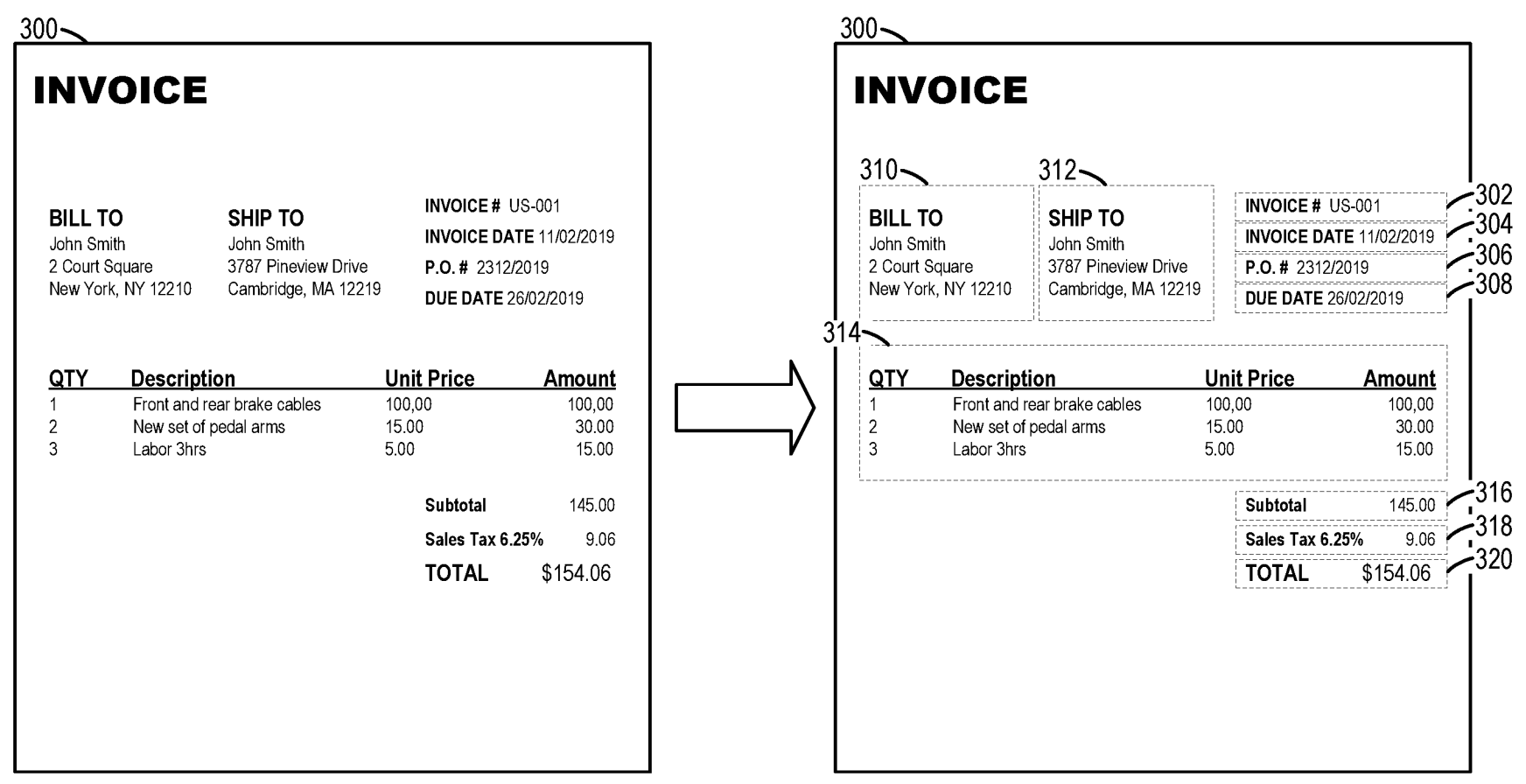
Figure 3B:
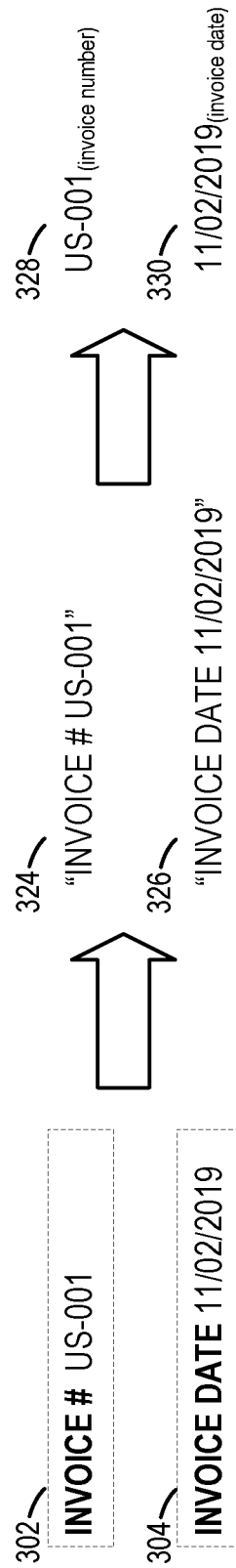

To further clarify the foregoing, FIGS. 3A and 3B depict an example invoice 300 that may be processed by data extractor 106 in accordance with workflow 200. As shown in FIG. 3A, invoice 300 is first segmented (via image segmentation deep learning model 114) into a number of segments 302-320 representing discrete visual elements in the layout of the invoice (e.g., invoice # segment 302, invoice date segment 304, etc.).

Then each segment is converted into text via OCR and the OCR'ed text is processed (via NER deep learning model 116) to annotate/extract the named entities. For example, as shown in FIG. 3B, segments 302 and 304 are converted into OCR'ed text strings "INVOICE #US-001" (reference numeral 324) and "INVOICE DATE 11/02/19" (reference numeral 326) respectively. These text strings are subsequently processed to obtain the data in each string; for example, "US-001" in text string 324 is recognized and annotated as an "invoice number" entity (reference numeral 328) and "11/02/19" in text string 326 is recognized and annotated as an "invoice date" entity (reference numeral 330).

It should be appreciated that the data extraction workflow shown in FIG. 2 and described with respect to FIGS. 3A and 3B is illustrative and various modifications are possible. For instance, although workflow 200 indicates that data extractor 106 applies the same NER deep learning model (i.e., model 116) to each document segment, in certain embodiments data extractor 106 may dynamically select and apply one of multiple different NER deep learning models based on the type of the segment (and/or other segment characteristics). For example, in one set of embodiments, if the segment is a "field" type data extractor 106 may apply a first NER deep learning model M1 that is trained to accurately recognize named entities in fields, and if the segment is a "table" type data extractor 106 may apply a second NER deep learning model M2 that is trained to accurately recognize named entities in tables. One of ordinary skill in the art will recognize other variations, modifications, and alternatives.

4. Example Computing Device/System

Figure 4:
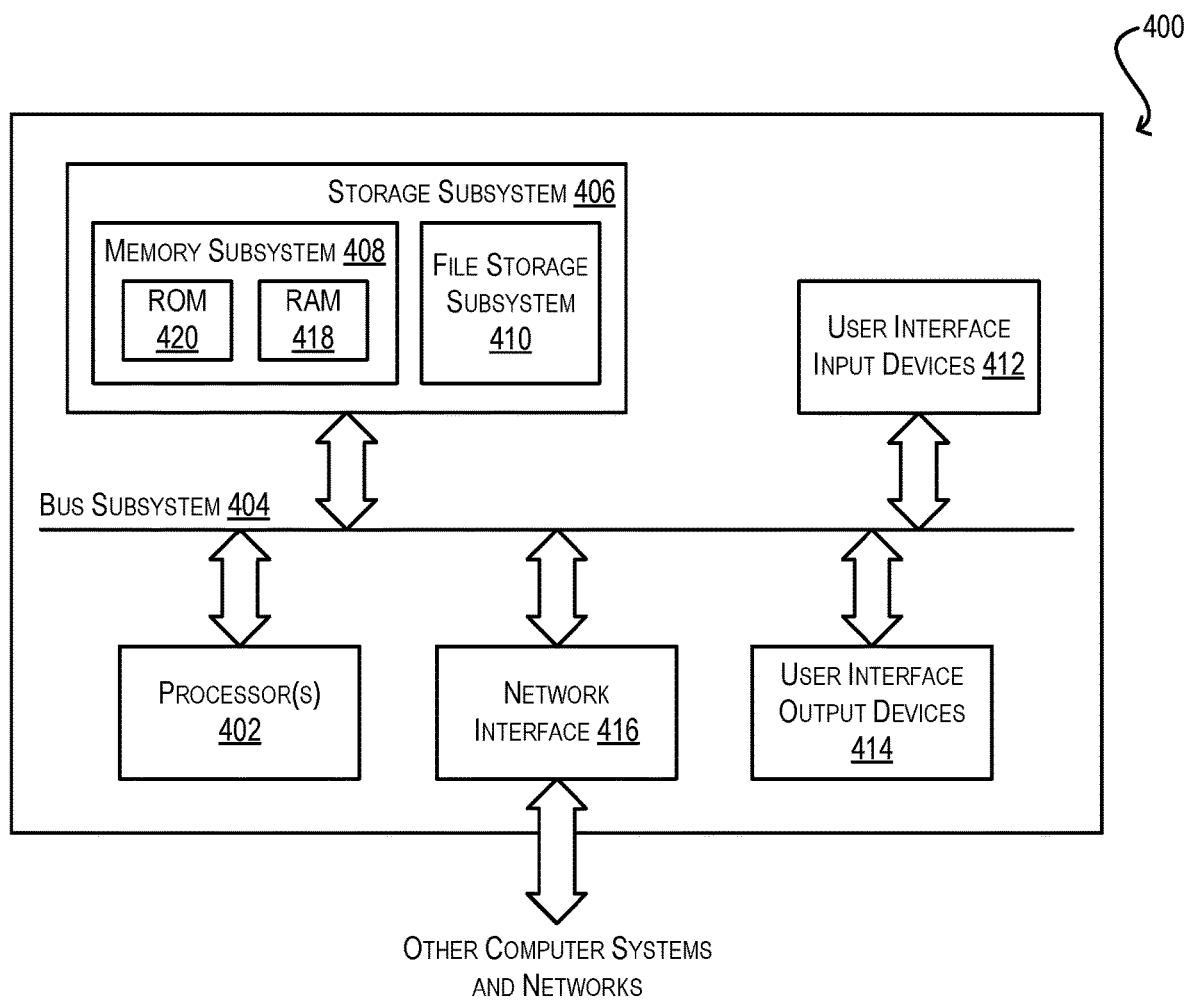
FIG. 4 depicts an example computing device/system according to certain embodiments.

FIG. 4 is a simplified block diagram illustrating the architecture of an example computing device/system 400 according to certain embodiments. Computing device/system 400 (and/or equivalent devices/systems) may be used to run any of the software described in the foregoing disclosure, including document processing system 102 of FIG. 1 and its constituent components. As shown in FIG. 4, computing device/system 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computing device/system 400 communicate with each other as intended. Although bus subsystem 404 is shown schematically as a single bus, alternative embodiments of the bus subsystem can utilize multiple busses.

Network interface subsystem 416 can serve as an interface for communicating data between computing device/system 400 and other computer systems or networks. Embodiments of network interface subsystem 416 can include, e.g., an Ethernet module, a Wi-Fi and/or cellular connectivity module, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computing device/system 400.

User interface output devices 414 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computing device/system 400.

Storage subsystem 406 includes a memory subsystem 408 and a file/disk storage subsystem 410. Subsystems 408 and 410 represent non-transitory computer-readable storage media that can store program code and/or data that provide the functionality of embodiments of the present disclosure.

Memory subsystem 408 includes a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computing device/system 400 is illustrative and other configurations having more or fewer components than computing device/system 400 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of software and hardware, it should be recognized that other combinations of software and hardware are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a computer system, a document in an electronic format;
   segmenting, by the computer system using an image segmentation deep learning model, the document into a plurality of segments, wherein each segment corresponds to a visually discrete portion of the document that includes content of the visually discrete portion as presented in the document, and wherein the image segmentation deep learning model classifies the segment as being an instance of one of a plurality of segment types found in documents on which the image segmentation deep learning model is trained; and
   for each segment in the plurality of segments:
      retrieving, by the computer system, text in the segment using optical character recognition (OCR); and
      extracting, by the computer system, data in the segment from the retrieved text using a named entity recognition (NER) deep learning model,
   wherein the NER deep learning model is selected from among a plurality of NER deep learning models based on the segment type of the segment as classified by the image segmentation deep learning model.

2. The method of claim 1 wherein the plurality of segment types includes a field type and a table type.

3. The method of claim 2 wherein if the segment is an instance of a table type, the retrieving and the extracting comprises:
   identifying, using the image segmentation deep learning model, a plurality of table cells in the segment;
   retrieving text from each table cell using OCR; and
   extracting data in each table cell from the retrieved text of the table cell using the NER deep learning model.

4. The method of claim 1 wherein the extracting comprises:
   identifying portions of the text that correspond to named entities; and
   annotating each portion with its corresponding named entity.

5. The method of claim 1 further comprising:
   combining the data extracted from the plurality of segments into a data object or file; and
   providing the data object or file to one or more downstream components of a document processing system.

6. The method of claim 5 wherein the one or more downstream components include an anomaly detection component configured to detect, using an anomaly detection deep learning model, anomalies in the data included in the data object or file.

7. The method of claim 1 wherein the NER deep learning model is selected from among the plurality of NER deep learning models based on the segment type and one or more other characteristics of the segment.

8. A non-transitory computer readable storage medium having stored thereon program code executable by a computer system, the program code embodying a method comprising:
   receiving a document in an electronic format;
   segmenting, using an image segmentation deep learning model, the document into a plurality of segments, wherein each segment corresponds to a visually discrete portion of the document that includes content of the visually discrete portion as presented in the document, and wherein the image segmentation deep learning model classifies the segment as being an instance of one of a plurality of segment types found in documents on which the image segmentation deep learning model is trained; and
   for each segment in the plurality of segments:
      retrieving text in the segment using optical character recognition (OCR); and
      extracting data in the segment from the retrieved text using a named entity recognition (NER) deep learning model,
   wherein the NER deep learning model is selected from among a plurality of NER deep learning models based on the segment type of the segment as classified by the image segmentation deep learning model.

9. The non-transitory computer readable storage medium of claim 8 wherein the plurality of segment types includes a field type and a table type.

10. The non-transitory computer readable storage medium of claim 9 wherein if the segment is an instance of a table type, the retrieving and the extracting comprises:
    identifying, using the image segmentation deep learning model, a plurality of table cells in the segment;
    retrieving text from each table cell using OCR; and
    extracting data in each table cell from the retrieved text of the table cell using the NER deep learning model.

11. The non-transitory computer readable storage medium of claim 8 wherein the extracting comprises:

identifying portions of the text that correspond to named entities; and annotating each portion with its corresponding named entity.

12. The non-transitory computer readable storage medium of claim 8 wherein the method further comprises:

combining the data extracted from the plurality of segments into a data object or file; and providing the data object or file to one or more downstream components of a document processing system.

13. The non-transitory computer readable storage medium of claim 12 wherein the one or more downstream components include an anomaly detection component configured to detect, using an anomaly detection deep learning model, anomalies in the data included in the data object or file.

14. The non-transitory computer readable storage medium of claim 8 wherein the NER deep learning model is selected from among the plurality of NER deep learning models based on the segment type and one or more other characteristics of the segment.

15. A computer system comprising:

a processor; and a non-transitory computer readable medium having stored thereon program code that, when executed by the processor, causes the processor to:

receive a document in an electronic format;

segment, using an image segmentation deep learning model, the document into a plurality of segments, wherein each segment corresponds to a visually discrete portion of the document that includes content of the visually discrete portion as presented in the document, and wherein the image segmentation deep learning model classifies the segment as being an instance of one of a plurality of segment types found in documents on which the image segmentation deep learning model is trained; and for each segment in the plurality of segments:

retrieve text in the segment using optical character recognition (OCR); and extract data in the segment from the retrieved text using a named entity recognition (NER) deep learning model, wherein the NER deep learning model is selected from among a plurality of NER deep learning models based on the segment type of the segment as classified by the image segmentation deep learning model.

16. The computer system of claim 15 wherein the plurality of segment types includes a field type and a table type.

17. The computer system of claim 16 wherein if the segment is an instance of a table type, the program code that causes the processor to perform the retrieving and the extracting comprises program code that causes the processor to:

identify, using the image segmentation deep learning model, a plurality of table cells in the segment;

retrieve text from each table cell using OCR; and extract data in each table cell from the retrieved text of the table cell using the NER deep learning model.

18. The computer system of claim 15 wherein the program code that causes the processor to perform the extracting comprises program code that causes the processor to:

identify portions of the text that correspond to named entities; and annotate each portion with its corresponding named entity.

19. The computer system of claim 15 wherein the program code further causes the processor to:

combine the data extracted from the plurality of segments into a data object or file; and provide the data object or file to one or more downstream components of a document processing system, the one or more downstream components including an anomaly detection component configured to detect, using an anomaly detection deep learning model, anomalies in the data included in the data object or file.

20. The computer system of claim 15 wherein the NER deep learning model is selected from among the plurality of NER deep learning models based on the segment type and one or more other characteristics of the segment.

* * * * *